March 7, 1933.   A. J. R. LYSHOLM   1,900,118
HYDRAULIC VARIABLE SPEED POWER TRANSMISSION
Filed Nov. 23, 1932   5 Sheets-Sheet 1
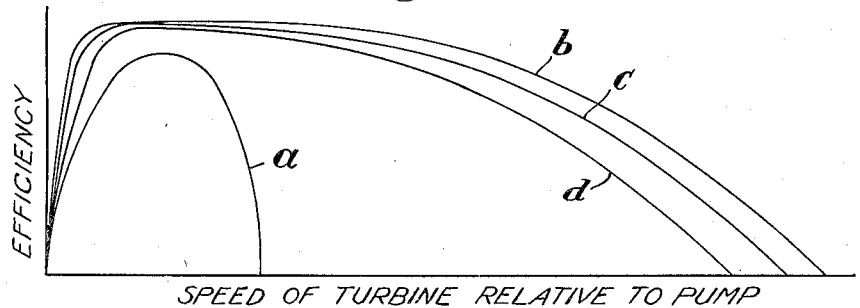
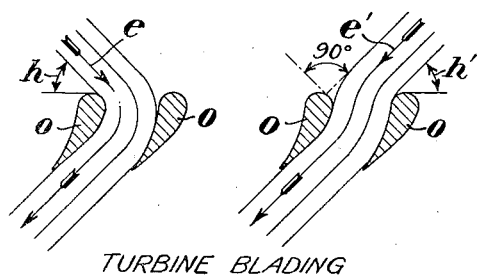
TURBINE BLADING
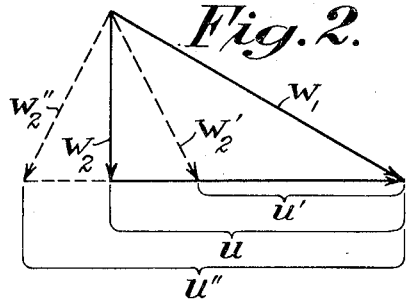
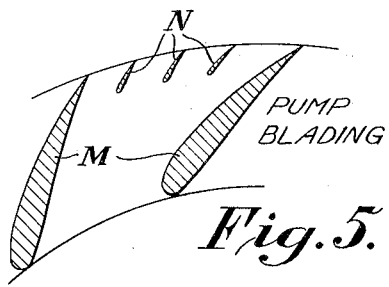
PUMP BLADING
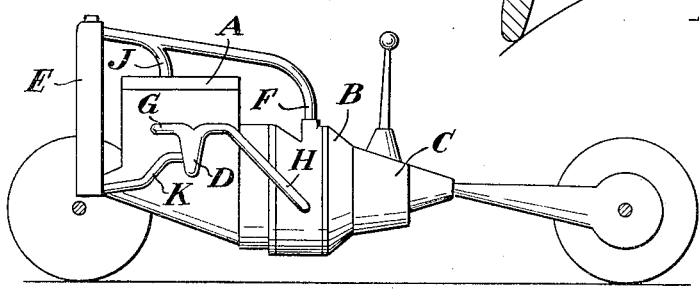
INVENTOR
Alf James Rudolf Lysholm
BY
Wm T. Hedlund
his ATTORNEY

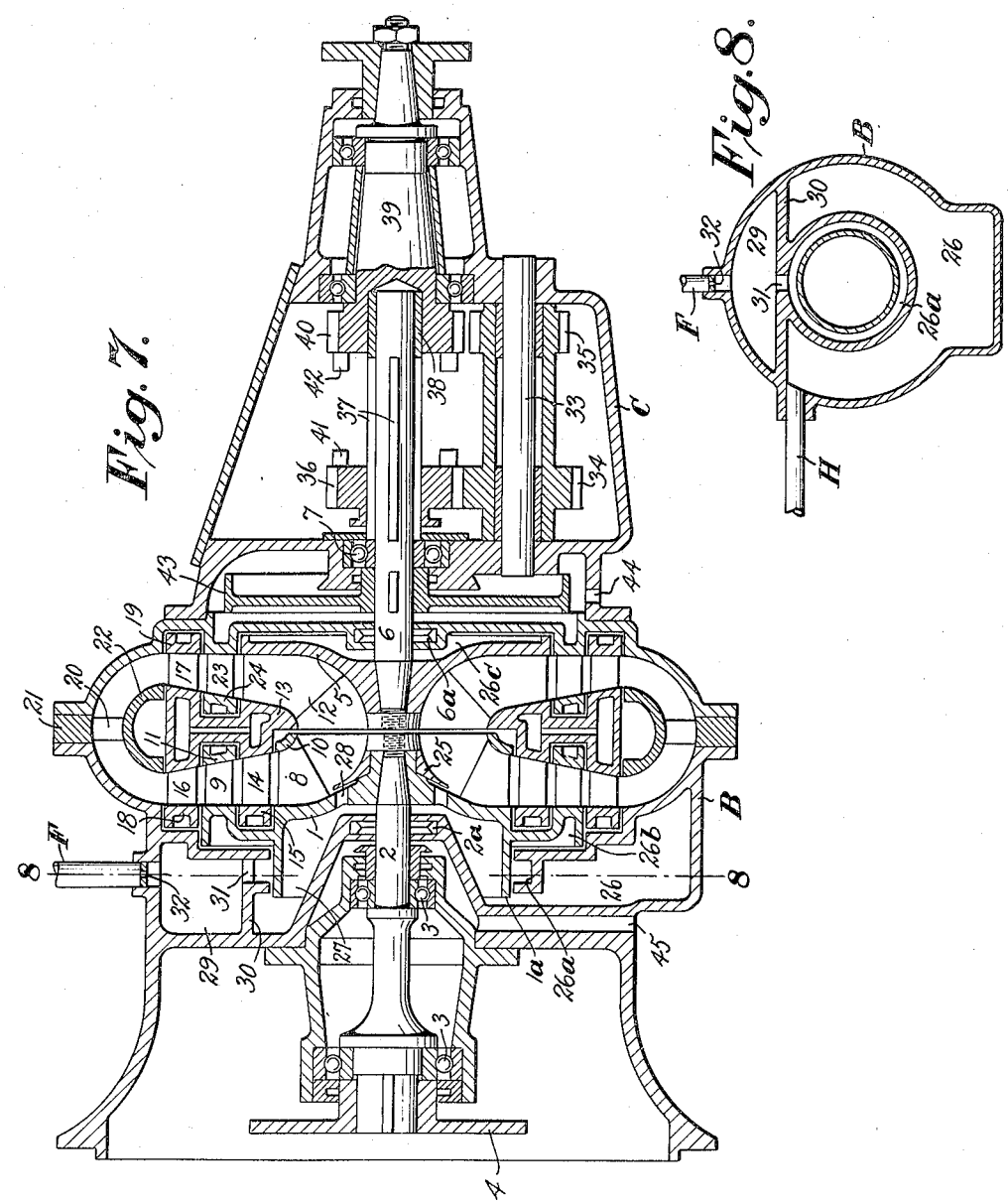

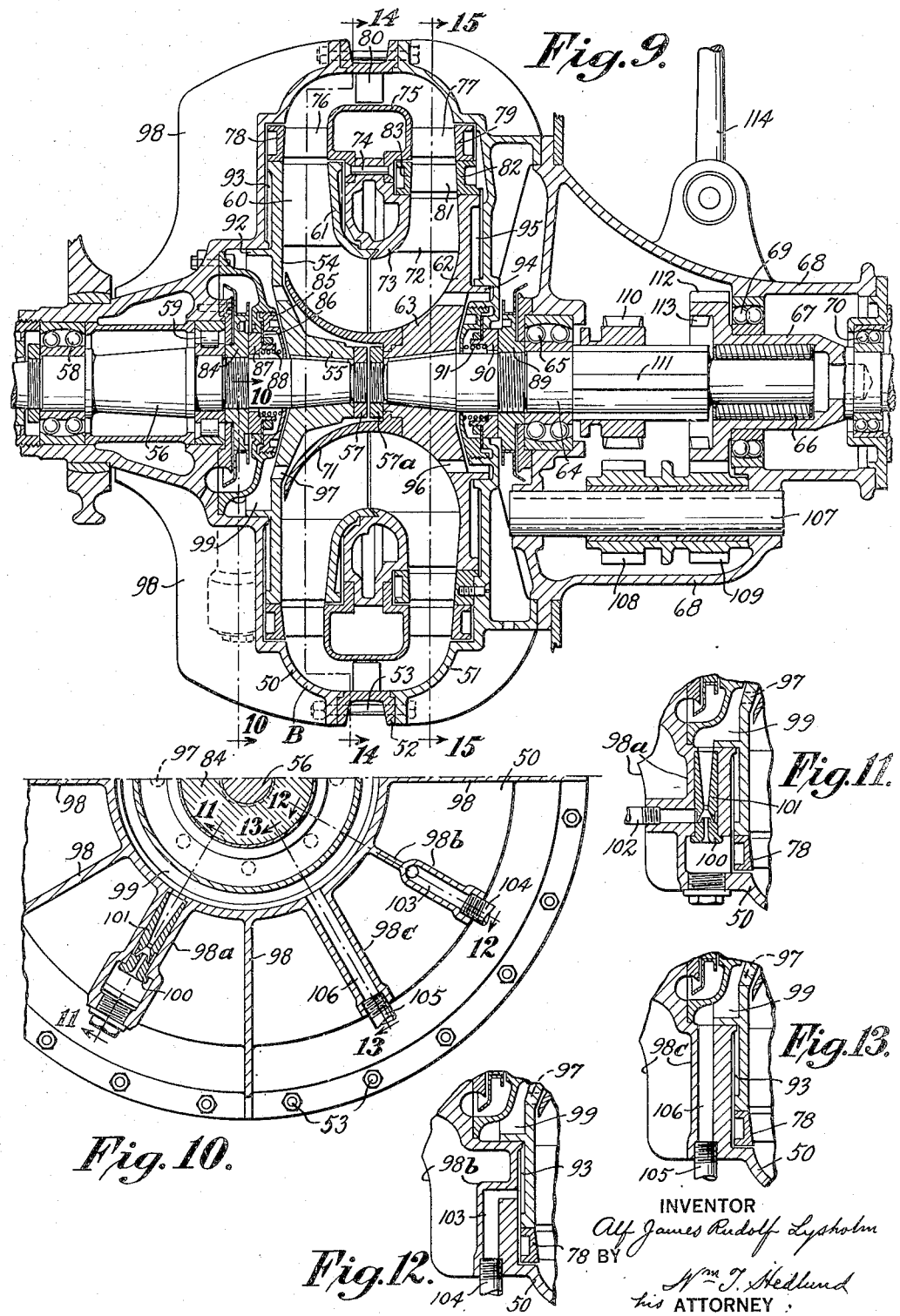

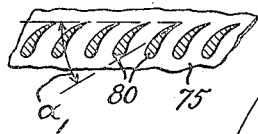
Fig.16.
Fig.14.
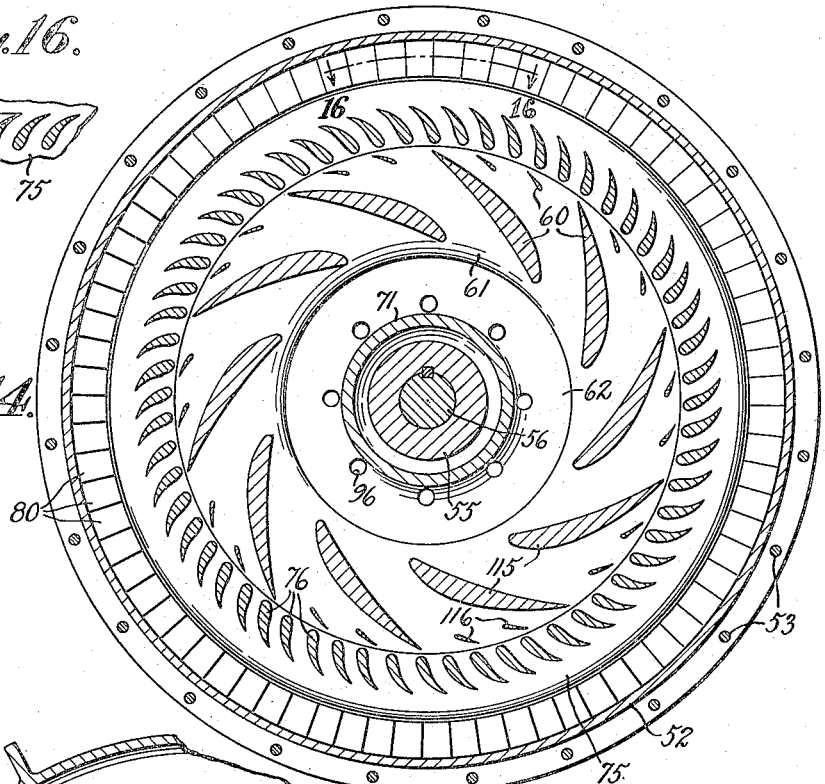
Fig.15.
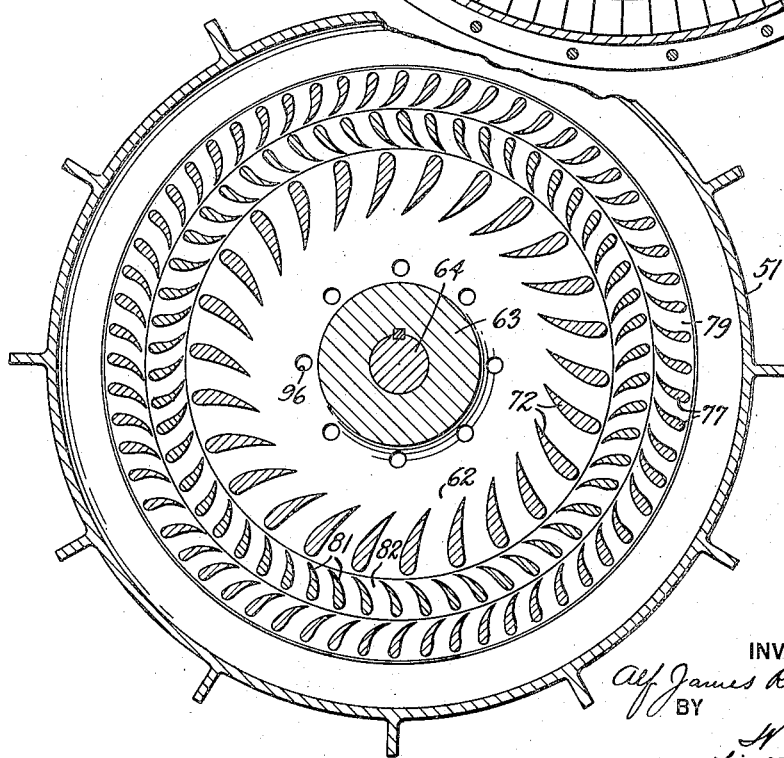

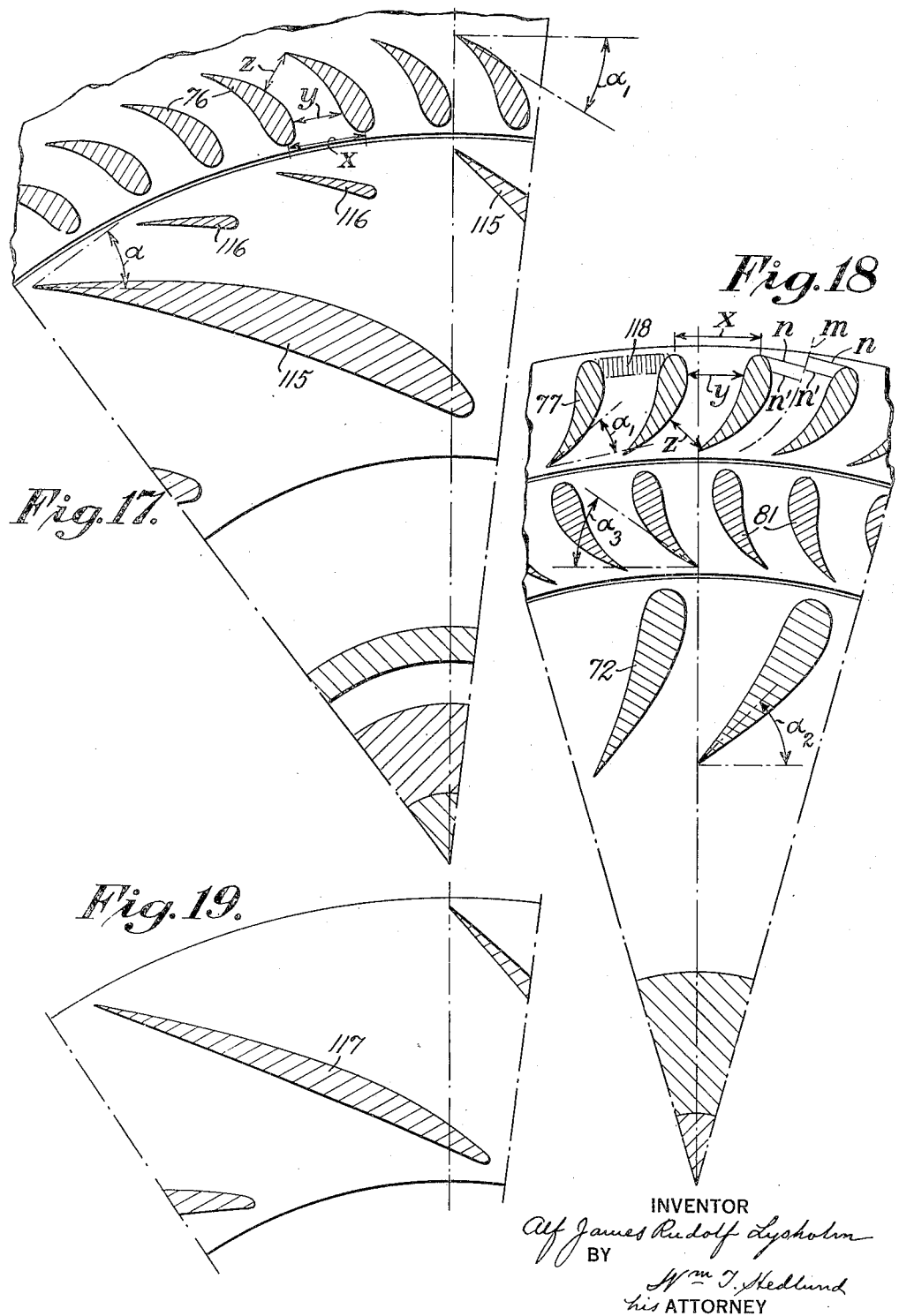

Patented Mar. 7, 1933

1,900,118

UNITED STATES PATENT OFFICE

ALF JAMES RUDOLF LYSHOLM, OF STOCKHOLM, SWEDEN, ASSIGNOR TO AKTIEBOLAGET LJUNGSTROMS ANGTURBIN, OF STOCKHOLM, SWEDEN, A CORPORATION OF SWEDEN

HYDRAULIC VARIABLE SPEED POWER TRANSMISSION

Application filed November 23, 1932, Serial No. 644,032, and in Sweden November 22, 1926.

This application is a continuing application replacing my copending application Serial No. 234,175 filed November 18, 1927 and relates back to said application Serial No. 234,175, as to all subject matter common to the two applications for all dates and rights incident to the filing of said application Serial No. 234,175 and cases corresponding thereto filed in foreign countries.

The present invention relates to hydraulic variable-speed power transmissions and has particular reference to hydraulic variable-speed power transmissions of the type in which power is transmitted from a driving member comprising a pump or impeller part to a driven member comprising a turbine part, due to circulation of a working fluid in a closed path of flow through these parts. Still more particularly the invention relates to transmissions of the above character in which the driving or pump member and the driven or turbine member are arranged so that the working fluid leaving one of the members passes directly, or substantially directly, to the other member.

A principal object of the invention is to provide an improved transmission of the character described which is capable of transmitting power at relatively high efficiency over a comparatively wide range of speed of the driven member relative to the speed of the driving member while at the same time having the properties of torque conversion, that is to say, of torque multiplication, which are essential to a satisfactory variable-speed power transmission.

The more specific nature of the invention and the manner in which the above and other and more detailed objects thereof are attained will be set forth more fully in conjunction with the ensuing specification and description of apparatus embodying the invention.

In the accompanying drawings, forming a part of this specification:

Fig. 1 shows more or less diagrammatically the relation of efficiency curves for different forms of apparatus;

Fig. 2 is a diagram illustrative of certain inlet velocity characteristics of the working fluid;

Fig. 3 shows diagrammatically the lines of fluid flow past turbine blades according to the invention when the turbine member is stationary;

Fig. 4 is similar to Fig. 3 and shows diagrammatically the lines of fluid flow when the turbine member is racing;

Fig. 5 shows more or less diagrammatically part of a pump member;

Fig. 6 shows more or less diagrammatically the application to a vehicle chassis of one form of transmission embodying the invention;

Fig. 7 is a longitudinal section on enlarged scale of a transmission such as shown in Fig. 6;

Fig. 8 is a transverse section taken on the line 8—8 of Fig. 7 and on a reduced scale;

Fig. 9 is a longitudinal section of a transmission which I have built and successfully operated;

Fig. 10 is a transverse half section on the line 10—10 of Fig. 9;

Figs. 11 to 13 inclusive are longitudinal sections taken on the respectively numbered section lines in Fig. 10 and showing parts of the apparatus;

Fig. 14 is a transverse section taken on the line 14—14 of Fig. 9;

Fig. 15 is a transverse section taken on the line 15—15 of Fig. 9;

Fig. 16 is a longitudinal section taken on the line 16—16 of Fig. 14;

Fig. 17 shows a part of the structure of Fig. 14 on enlarged scale;

Fig. 18 shows a part of the structure of Fig. 15 on enlarged scale; and,

Fig. 19 shows a form of pump blade slightly different from that shown in Fig. 14.

In order to provide a practical variable-speed power transmission, three principal operating conditions must be fulfilled. The first condition is that the maximum efficiency of power transmission from the driving member to the driven member must be relatively high. The second condition is that the transmission must be capable of transmitting power from the driving member to the driven member over a comparatively wide range of relative speed between these members at an efficiency which approaches as closely as possible the maximum efficiency of the device. It will be evident that if the transmission has either a low maximum efficiency or has an efficiency characteristic which results in rapid drop in the efficiency obtained when the speed varies from the speed giving maximum efficiency, the transmission will not provide sufficient advantage due to its variable speed character to compensate for the losses in power transmission. In addition, due to the fact that power which is lost in transmissions of the character in question is converted into heat, the aforementioned conditions must be met if a cooling system of excessive size for the operating fluid is to be avoided. The third condition is that the transmission must be capable of providing a relatively large ratio of torque multiplication, particularly when operating under conditions resulting in high relative speed between the driving member and the driven member.

Broadly speaking, I provide a transmission fulfilling the first of the above conditions by utilizing a multiple stage turbine or driven member which effectively utilizes in each succeeding row of blades the energy in the working fluid discharged from the preceding blade row. By utilizing a plurality of turbine stages the outlet loss from the last stage may be reduced to a relatively unimportant value. The second of the above conditions I fulfill by the provision of turbine blading of special profile, as will hereinafter be more fully pointed out, which blading, due to its ability to receive the working fluid at widely varying relative inlet angles without substantial loss in efficiency of operation, provides a transmission, the efficiency of which is much more nearly constant in the normal range of operation of the transmission than would be the case of blading of the usual type of profile were employed. The third condition I fulfill by employing between the successive rows of blades on the driven member, rows of rotationally stationary guide blades, which guide blades provide what may be considered abutment surfaces against which the working fluid discharged from the preceding row of turbine blading impinges and from which force reacts through the working fluid to increase the torque or turning moment acting upon the driven member. Other characteristics of the blading arrangement I employ, which characteristics assist in the production of relatively uniform high efficiency and a high ratio of torque multiplication, will be explained in further detail in the ensuing description.

In order to assist in an understanding of the nature of the problem involved and the manner of its solution, I have shown in Fig. 1, more or less diagrammatically, a series of curves of efficiency of power transmission between a driving and driven member, for different hydraulic apparatuses.

Turning now to Fig. 1, the curve indicated at $a$ represents the theoretical character of efficiency of a hydraulic transmission of the general type under discussion having a driven member comprising but a single row of blades. This curve is parabolic in form and it will be noted that the efficiency of the apparatus drops comparatively rapidly upon change in relative speed from that at which maximum efficiency is obtained. The character of the efficiency curve, however, will be entirely different for a transmission having an infinite number of blade rows, in which each succeeding blade row utilizes the energy of the working fluid discharged from the preceding blade row, the energy of the working fluid discharged from the turbine being so small as to be neglectable. The curves illustrating the efficiency of such an apparatus are shown at $b$, $c$ and $d$, curve $b$ indicating the efficiency when the blading is arranged to discharge working fluid at an angle of 20° with respect to the plane of the blade row in the case of axial flow blading and with respect to a tangent to the blade circle at the outlet of the blades in radial flow blading, this angle being hereinafter referred to as the outlet angle of the blading, curve $c$ representing the efficiency curve for blading having an outlet angle of 30° and curve $d$ representing the efficiency for blading having an outlet angle of 45°.

The following calculations will serve to indicate how the theoretical hydraulic efficiency of apparatus employing an infinite number of turbine stages will vary, based upon the friction losses incurred. Referring now more particularly to Fig. 2, let $w_1$ represent the direction and magnitude of the absolute discharge of working fluid from a blade row and $w_2$ indicate the direction and magnitude of the relative inlet velocity of the working fluid with respect to the succeeding blade row having a peripheral velocity of $u$. The useful pressure drop in such succeeding blade row is then:

$$\frac{w_1^2 - w_2^2}{2g} = p_u$$

where $g$ is the acceleration due to gravity, and the pressure drop due to friction loss in the blade row equals $$\frac{\varphi}{2} \times \frac{w_1^2 + w_2^2}{2g} = p_f$$

where $\varphi$ is the coefficient of friction.

The total drop in pressure $p$ through the blade row, is $$p = p_u + p_f = \frac{w_1^2 - w_2^2}{2g} + \frac{\varphi}{2} \times \frac{w_1^2 + w_2^2}{2g}$$

The efficiency $$\eta = \frac{p_u}{p_u + p_f} = \frac{p_u}{p}$$

If $u$ is the peripheral velocity of the blade row the efficiency can be calculated from known principles of hydraulics as a function of $\frac{u}{w_1}$. With varying speeds of the pump member the amount of energy delivered by the pump will vary with the third power of the speed. Thus, if greater output is desired the speed of the pump must be increased and conversely if less output is desired the speed of the pump must be decreased. In the following discussion the pump will be considered as an energy producer and the efficiency of the turbine at different speeds will be examined assuming a constant energy supply, that is, a constant product of head (or pressure) and quantity of working fluid delivered to the turbine per unit time. Thus the total pressure drop in the turbine multiplied by the quantity of fluid $Q$ which is circulated must be constant, or, in other words, $\Sigma p \times Q = k$, a constant.

If a velocity triangle of $w_1$, $w_2$ and $u$ be drawn as in Fig. 2 (for reaction blading) and the peripheral speed $u$ be varied to values such as indicated at $u'$ and $u''$, the value of $w_2$ will decrease from $w_1$ at zero speed of the blade (represented by $u=$zero) to a minimum value when the direction of $w_2$ is perpendicular to $u$, representing a point hereinafter referred to as the optimum point, and will then again increase to a value equal to $w_1$ when the value of $u$ is increased to a speed representing racing, that is, a speed of the turbine so high that the working fluid passes through the blade row substantially without change in direction. From the above equations it follows that the value of the useful pressure drop $p_u$ will vary between zero and a maximum. The value of the pressure drop $p_f$ due to friction will vary between a maximum value of $$\frac{\varphi}{2} \times \frac{w_1^2}{g}$$

and a minimum value, and the value of the total pressure drop $p$ will vary between $$\frac{\varphi}{2} \times \frac{w_1^2}{g}$$

and a maximum value. Thus, at zero speed and at racing speed all available energy in the working fluid is taken up by friction alone.

Obviously, the conversion of energy to useful work will be zero at zero speed of the turbine blading and at racing speed thereof and will reach a maximum value at the optimum point. This conversion of energy can be calculated from the product $\Sigma p \times Q$, $Q$ having been assumed constant.

To get a constant product of $\Sigma p \times Q$ the flow of working fluid must be varied at all speeds in definite relation to the flow of working fluid at the optimum point. With increased flow the total pressure drop $p$ increases with the second power of the rate of flow and the useful conversion of energy therefore varies with the third power of the rate of flow. The increased rate of flow with respect to the rate of flow at the optimum point, may therefore be expressed in the following relation;

$$\sqrt[3]{\frac{p_{max}}{p}}$$

where $p_{max}$ denotes the total pressure drop at the optimum point.

The triangle of the velocity diagram must therefore be varied in a manner maintaining a corresponding relationship between the several factors, that is, increase in $u$ must be accompanied by an increase in $w_1$ corresponding to the above noted relation.

Turning again to Fig. 2, I have illustrated the manner in which variations in the value of $u$ (assuming a constant value for $w_1$) affect the relation of the relative inlet velocity $w_2$. In this figure, the full line triangle of $w_1$, $w_2$ and $u$ represents the value for $u$ (with the given value of $w_1$) which is productive of the optimum value for $w_2$. If the speed of the turbine blades, and consequently the value of $u$, is reduced to $u'$ ($w_1$ remaining constant) the value of $w_2$ increases and its direction relative to the blade row is altered as indicated at $w_2'$. If the blade speed is increased so that the value of $u$ becomes $u''$ the relative inlet velocity again increases, this factor being now represented by $w_2''$.

As hereinabove noted, it is desirable, in order to maintain $w_2$ at the optimum point, to increase the value of $w_1$ as the value of $u$ is increased, but it will be evident that in a given transmission there is a certain maximum value which can be obtained for $w_1$ and if, with the pump member delivering working fluid with maximum velocity, the speed $u$ is increased, the velocity triangle must then assume the form of the triangle $w_1$, $w_2''$, $u''$. Conversely there is a certain practical minimum limit for the value of $w_1$ and at very low speeds of the turbine blading the velocity triangle will assume the form $w_1'$, $w_2'$, $u'$. Thus it will be evident that the value and direction of the relative inlet velocity of the working fluid will vary, as indicated by the different positions of the vector $w_2$ in the diagram of Fig. 2, and in accordance with the present invention the usual losses in efficiency incident to this variation are minimized because of the form and arrangement of the turbine blading which is employed, as will later be explained more fully.

The foregoing theoretical considerations are based upon the use of an assumed structure having an infinite number of stages and a neglectable outlet loss from the turbine. Practical considerations definitely limit the number of turbine stages that may be employed, but I have found that by arranging the turbine and pump members in a manner to be hereinafter described, utilizing an outward and inward radial flow in a closed path of circulation, I can obtain commercially practical efficiencies with a comparatively small number of blade rows, when the blading is constructed in accordance with my invention. Preferably three rows of turbine blades are employed, since this number of rows of blades will so reduce the value of the outlet loss from the last row that the efficiency of the transmission will have a satisfactorily high value. It will be evident, of course, that if the factors of practical construction permit, more blade rows may be employed and a still higher efficiency be obtained. Conversely, if the use to which a transmission is to be put is such that the utmost in hydraulic efficiency is less important than considerations of size, weight and cost, a transmission having satisfactory efficiency characteristics can, if constructed in accordance with my invention, be made with but two rows of turbine blades, although it will be appreciated that the efficiency of such a transmission cannot be so high as that having three rows. I prefer to use at least three rows of turbine blades in all cases where the transmission is used for the transmission of power from a prime mover during all or a major portion of the time the prime mover is in operation.

Turning now for a moment to the important factor of obtaining torque multiplication, it will be evident that if the working fluid is to exert a turning force or torque on the turbine blades its direction must be changed in its passage through the blade rows. I have found that in order to obtain suitable torque multiplying characteristics, the turbine blading should be arranged so that the outlet angle of the blading is within a range having a minimum limit of approximately 20° and a maximum limit of approximately 45°. Referring to Fig. 1, and again considering the theoretical turbine of infinite number of stages, curve $b$ represents the efficiency characteristics of a turbine employing blading having an outlet angle of 20°, curve $c$ the efficiency characteristics for blading having an outlet angle of 30° and curve $d$ the efficiency characteristics for blading having an outlet angle of 45°. It is to be noted that the theoretical hydraulic efficiency is different with different blade outlet angles but the outlet angle for any given transmission is not that angle which gives the greatest peak efficiency but the angle which gives the greatest average efficiency within the range of speed of operation (relative to the speed of the driving member) for which the turbine member of the particular transmission is to operate. In the selection of the most advantageous outlet angle or angles for the rows of turbine blading, the shock or impact loss due to impingement of the working fluid against the inlet edges of the blades is a decisive factor. The reason for this will be apparent from a consideration of Figs. 3 and 4, which illustrate more or less diagrammatically the relation of the direction of flow of the working fluid with respect to the turbine blading under different conditions of operation. In Fig. 3 there is shown two adjacent turbine blades 0 having an outlet angle of substantially 45°, and if it be assumed that these blades are stationary the relative inlet velocity of fluid entering the blade row from a preceding blade row having a similar outlet angle will be along lines of flow such as those indicated by the arrow $e$ in the figure. If now, we consider the blades 0 when the driven member is operating at racing speed, the relative inlet velocity of the fluid entering the blades will be as indicated at $e'$ in Fig. 4. Thus the variation in the relative inlet angle of the working fluid with respect to the blading will vary through an angle of 90°, as indicated in Fig. 4, between zero speed and racing speed of the driven member, when the blading has an outlet angle of 45°. The lines indicating the flow of working fluid to the blades, indicated in Figs. 3 and 4, correspond to the vector $w_2$ in the velocity triangle shown in Fig. 2.

From a consideration of Figs. 3 and 4, it will be apparent that if the outlet angle of the blading is 30° instead of 45° the angle between the lines representing the plane of rotation of the blades and the relative flow of working fluid toward the blade row will be an angle $h$ of 30° in Fig. 3 and an angle $h'$ of 30° in Fig. 4, from which it follows that the maximum variation in the relative inlet angle between zero speed and racing speed and with 30° blading, will be 120° instead of 90°. Similarly if the outlet angle of the blading is reduced to 20° the maximum variation in the relative inlet angle will amount to 140°.

The greater the amount of maximum variation in the relative inet angle the greater will be the average of the impact losses, since there is for any blade an optimum point at which the impact loss is a minimum. This indicates the selection of blading having the maximum outlet angle, since with such blading the possible variations in the relative inlet angle is a minimum. On the other hand, however, the greater the outlet angle of the blading the greater is the frictional loss in the blading. Also, the torque multiplying characteristic of the blading decreases in value as the outlet angle is increased. All of the above factors must be taken into consideration in determining the best outlet angle for any given design. I have found that within the range of outlet angles discussed above, the most favorable outlet angle in the majority of instances, particularly for blading in the row of blades receiving working fluid from the pump member and for intermediate rows of blading, is in the neighborhood of 30°. The row of blading in the last row of blades should, however, have a somewhat greater outlet angle in order to reduce the peripheral component of flow of the fluid as discharged from the last row of blades. By making the outlet angle of the last row of blades somewhat greater than that for the first and intermediate row or rows of blades, the outlet loss from the last row of blading is kept to a minimum.

In order to obtain the desired high efficiency, I employ turbine blading of the reaction type rather than blading of the action or impulse type. In this connection it will be understood that by reaction blading I mean blading which extracts energy from the working fluid mainly due to reaction, although some small proportion of the energy may be extracted due to impulse. Reaction blading is particularly suitable for this type of apparatus because of the fact that the discharge flow from such blading is smoother and better suited to be utilized in a succeeding row of blading than is the flow from impulse blading.

In order to minimize the increase in shock or impact loss when the relative inlet angle of the working fluid varies from the optimum angle, I provide blades having bluntly rounded inlet edges as indicated in Figs. 3 and 4, the inlet portions of the blades being substantially thicker than is the case with the usual form of reaction blade profile. These characteristics of the blade profile have a very marked effect upon the efficiency characteristics of the transmission under variable speed operating conditions, which I will hereinafter point out more in detail in connection with the description of a specific embodiment of my invention.

In Fig. 5 I have shown more or less diagrammatically a suitable form of blading for the pump member used in a transmission embodying the invention. Preferably the pump blades are of the same general characteristic form as the turbine blades, being provided with relatively thick inlet edges which are bluntly rounded. It is not, however, essential to the successful operation of a transmission built in accordance with the present invention for the pump blades to have the same profile characteristics as those of the turbine blading. The pump blades may have profiles more nearly in accordance with usual practice in the design of impellers, without materially impairing the efficiency of the transmission.

In some instances, in order to obtain efficient guiding of the working fluid as discharged from the pump member, I employ small guide blades N, one or more of which may be disposed between each two adjacent pump blades M.

Turning now to Fig. 6, I have illustrated diagrammatically the application of a transmission according to the invention to the chassis of a motor driven vehicle. In this figure A is an internal combustion engine supplying power to a variable-speed transmission within the housing B, the transmission having interposed between it and the driving axle of the vehicle a mechanical reverse gear situated in the housing C. D represents the pump for circulating cooling fluid for cooling the engine, which fluid in the embodiment illustrated is employed as the working fluid in the transmission. The cooling jackets of the engine and the interior of the transmission are placed in communication with the delivery of the pump D by conduits G and H, respectively. A radiator or cooler for the fluid is indicated at E, which cooler is connected both to the transmission and to the motor by conduits F and J, respectively, and from which fluid is supplied to the pump D through a suitable connection K. It will be evident that with the arrangement indicated the transmission and the cooling jackets of the engine are connected in parallel with respect to flow of working fluid to and from the cooler and flow of working fluid to and from the transmission may be effected either through thermic-siphon action or due to pressure generated by the pump D. For a purpose which will be later explained, the fluid flowing to the transmission through conduit H may be maintained under a positive pressure by suitable throttling of flow through conduits F and G.

In Fig. 7 I have shown on enlarged scale one form of transmission embodying the invention. In this transmission the driving member comprises a pump or impeller rotor 1 rigidly secured to the shaft 2 which is rotatably mounted within the casing B as by ball bearings 3 and which is adapted to be driven from the engine of the vehicle through a suitable connection such as indicated at 4. In the embodiment illustrated the driving member is adapted to be driven at engine speed directly from the main shaft of the engine but it will be appreciated that the driving member may be indirectly connected to the engine through gearing which may cause the driving member of the transmission to rotate at a higher or lower speed than that of the engine shaft.

The driven member of the transmission comprises a turbine rotor or disc 5 rigidly secured to shaft 6 which is rotatably mounted in the casing, preferably by means of ball bearings 7, in axial alignment with the shaft part of the driving member. The casing B provides a closed chamber in which the rotors 1 and 5 are situated. The rotor 1 carries two circular rows of pump or impeller blades indicated at 8 and 9 the inner ends of the blades in these rows being supported by the ring parts 10 and 11, respectively. The row of blades 9 is placed radially outwardly of the row of blades 8 and the two rows are radially spaced apart.

The rotor 5 of the driven member has secured thereto a circular row of turbine blades 12, the inner ends of which serve to support a ring member 13 situated centrally of the chamber formed by the casing B. Member 13 has secured thereto a circular row of turbine blades 14 situated between the rows of pump blades 8 and 9 and supported at their axially outer ends by a ring 15 situated in a suitable annular recess in the rotor 1.

The member 13 also has secured thereto at axially opposite sides the rows of turbine blades 16 and 17, the axially outer ends of which are supported by the rings 18 and 19. respectively, these rings being situated in suitable annular recesses in the walls of the casing.

Between the rows of turbine blades 16 and 17 and extending radially inwardly from the outer periphery of the casing is a row of stationary guide blades 20. Blades 20 may advantageously be secured at their radially outer ends to a ring 21 and this ring may advantageously form a part of the housing suitably bolted between two axially separable main casing members. The inner ends of blades 20 are secured to an annular ring-like member 22.

A second row of guide blades 23 is carried by the casing and ring 24, this row of guide blades being disposed between the rows of turbine blades 17 and 12.

The ring-like member 22, together with parts of rotor members 1 and 5, the member 13, the several annular rings to which the rows of blades are secured and portions of the casing provide a main or working space for flow of working fluid which space is in the form of an annular torus.

In order to facilitate the smoothness of flow in the channel provided by this annular space, a flaring collar 25 is mounted on the rotor member 1.

As shown in Fig. 8, working fluid is supplied to the chamber 26 through pipe H and passes to the working space of the transmission in which the blading is located by way of passage 27 and ports 28 in the rotor of the driving member. The chamber 26 is separated from a second chamber 29 by a transverse partition 30. The stationary casing B provides one side wall of chamber 26 and has formed therein a circular groove 26a opening inwardly. A circular piston-like flange 1a on the member 1 projects axially across the open face of groove 26a to provide a substantially sealed balancing chamber 26b between the axially outer part of the rotor 1 and the wall of the casing B. The groove 26a is placed in communication with the chamber 29 by means of the port 31. Chamber 29 is connected with the outlet conduit F in which there is located a plate having therein a small orifice 32. A chamber 26c is formed between the driven rotor member 5 and the stationary wall of the housing B adjacent to this member.

This hydraulic power transmitting mechanism is capable of transmitting motion only in one direction of rotation, and for the purpose of reversing the direction of the motion of the vehicle, I have indicated in Fig. 7 a more or less conventional mechanical reversing gear in the housing C. This gear comprises a counter shaft 33 carrying gears 34 and 35. Gear 34 is adapted to mesh with gear 36 slidably mounted on splines 37 on the shaft 6, the rear end of this shaft being mounted in a bearing 38 in a socket in the shaft 39, adapted to be connected to the driving or propeller shaft of the vehicle. A gear 40 is provided at the forward end of shaft 39 and gears 35 and 40 are connected by the usual reverse idler pinion which lies outside of the plane of the drawings. Gears 36 and 40 are provided with laterally extending clutch teeth 41 and 42, respectively, and gear 36 is adapted to be shifted from the position shown in the figure to a position in which the clutch teeth 41 and 42 engage to provide direct drive from shaft 6 to shaft 39. In the position shown in the figure the gear is set for reverse drive through gears 36, 34, 35, the reverse idler pinion (not shown) and gear 40. In order to facilitate shifting of the mechanical gear just described from forward drive to reverse and vice versa, the shaft 6 has suitably fixed thereon a brake disc 43 adapted to be engaged by any suitable form of brake band or shoe (not shown).

The operation of the transmission just described is as follows:

Assuming the transmission to be filled with working fluid, the driving or pump member 1 is rotated by the engine and as a result of this movement working fluid is drawn from the radially inner portion of the working space of the transmission and forced radially outwardly by the rows of pump blades 8 and 9. The working fluid flows from the blade row 8 to the blade row 9 through the blade row 14 on the turbine member, tending to cause the turbine member to rotate, and after passing through the row of pump blades 9, where additional energy is imparted to it, the working fluid is delivered to the blade row 16 of the turbine member where further energy is extracted from the fluid. Fluid discharged from row 16 then passes through the stationary guide blades 20 which act to reverse the direction of the peripheral component of flow of the fluid. From the guide blades 20 fluid then flows successively through the row of turbine blades 17, the second row of stationary guide blades 23 and the last row of turbine blades 12. Since the flow through the pump blades and turbine blade rows 14 and 16 is radially outward these blades are arranged with the thickened inlet edges of the blades radially inward and since the flow through the turbine blade rows 17 and 12 and the guide blades 23 between these rows is radially inward, the blades in these three rows are arranged with the thickened inlet edges radially outward. The flow through the guide blades 20 is from left to right in the figure and these guide blades are arranged with the thickened inlet edges at the left.

In the arrangement illustrated it will be evident that the pressure of the working fluid increases as it flows outwardly through the pump blades to the outer portion of the working chamber and then decreases as it flows inwardly to the space between the turbine blades 12 and the first row of pump blades 8. By arranging the path of flow in this manner the pressure and also the velocity of the working fluid leaving the last row of turbine blades is made as small as possible since the fluid is discharged from a blade row of relatively small diameter and at a zone of relatively low pressure. This contributes to securing minimum outlet loss from the fluid as discharged from the turbine.

If the pump is operated at high speed it will exert a strong suction effect on the working fluid in the inner portion of the working chamber and in order to prevent cavitation of the working fluid in the zone of low pressure it is desirable to maintain all of the fluid in the working chamber under positive pressure. In the embodiment illustrated this is accomplished by utilizing the pump D to force fluid to the transmission and by placing the restriction 32 in the conduit F to prevent free flow of fluid from the interior of the transmission. A certain amount of working fluid under pressure will leak through the clearance space adjacent to the ring 18 and this fluid passing to the chamber 26b will provide balancing pressure tending to move the pump member to the right in Fig. 7 against the force exerted by the fluid in the main working chamber which tends to force the pump member to the left. Pressure in chamber 26b is maintained due to the small clearance between the walls of groove 26a and the piston 1a. Such fluid as leaks into groove 26a passes through chamber 29 and through conduit F to the cooler. Chamber 26c is provided for balancing the end thrust exerted on the turbine member 5, fluid leaking into this chamber from the working chamber through the clearance space adjacent the row of guide blades 23 and being maintained under pressure within the chamber by the packing 6a around shaft 6. Such fluid as leaks through this packing flows from the transmission through the vent 44. Shaft 2 is provided with packing 2a to prevent leakage from chamber 26 and such fluid as passes packing 2a is vented through the passage 45. Leakage of working fluid to balancing chambers 26b and 26c and all other leakage from the working space of the transmission is compensated for by flow of working fluid from the admission chamber 26 through the ports 28. Advantageously these ports are shielded by the collar 25 which provides a smooth wall for the working chamber at this point and serves to reduce any loss due to eddies and the like which might occur if the working fluid flowed directly across the open ports 28, particularly since the direction of flow of the main body of fluid in this portion of the working chamber is generally opposite the direction of flow of fluid passing through the ports 28.

Any resultant end thrust on the driving and driven members of the transmission is taken up by suitable thrust bearings which in the present instance may be one or more of the ball bearings in which the shafts are mounted, these bearings being of the combined radial and thrust type.

Chamber 26 may be advantageously, as illustrated, formed to provide a settling chamber at the lower part of the transmission for separation of impurities in the working fluid.

Turning now to Figs. 9 to 18, I have illustrated a transmission which I have built and successfully operated. This transmission will transmit approximately 75 H. P. with the driving member running at a speed of 1800 revolutions per minute, and when utilizing as a working fluid kerosene mixed with about five percent of lubricating oil, this transmission has operated with a maximum efficiency of approximately ninety percent.

In this embodiment of the transmission the casing indicated generally at B comprises parts 50 and 51 between which there is clamped an intermediate ring 52. The clamping means consists of a series of bolts 53 passing through these parts. The driving or pump member comprises a disc-like rotor 54 the hub 55 of which is keyed to the tapered end of shaft 56, being retained in position by the nut 57. Shaft 56 is journalled in the casing part 50 by means of ball bearing 58, which is preferably a combined radial and thrust bearing, and a roller bearing 59. It will be evident that other types of bearings may be used instead. The rotor 54 carries a single row of axially extending pump blades 60, the axially inner ends of which are connected and supported by the ring 61.

The driven or turbine member comprises a disc-like rotor 62, the hub 63 of which is keyed to the tapered end of the driven shaft 64, and is retained in position by nut 57a. Shaft 64 is rotatably mounted in ball bearing 65 similar to bearing 58 and roller bearing 66 which is located in a suitable socket in the shaft member 67, which is in turn rotatably mounted in the casing part 68 in ball bearings 69 and 70.

The axially inner end of the rotor member 62 has secured thereto the annular flaring collar 71 which surrounds the hub 55 of the driving rotor and the nuts 57 and 57a which secure the two rotors to their respective shafts.

The rotor member 62 carries a row of turbine blades 72 which at their axially inner ends support an annular ring-like member 73 to which is secured, as by means of rivets 74, a second annular ring-like member 75.

Member 75 has secured thereto the rows of turbine blades 76 and 77 which at their axially outer ends are connected and supported respectively by the rings 78 and 79 situated in suitable recesses in the housing parts.

The intermediate housing ring 52 carries a row of guide blades 80 extending radially inwardly therefrom to a point closely adjacent to the ring member 75.

A second row of guide blades 81 is carried by ring 82 bolted to the housing part 51, and the axially inner ends of these blades are supported by the stationary ring 83 situated in an annular recess formed by the ring parts 73 and 75.

Leakage of working fluid from the transmission around shaft 56 is prevented by packing means comprising a disc 84 threaded on shaft 56. Ring 85 threaded in the housing part serves to clamp a resilient metal disc 86, which in turn supports a packing ring 87, which abuts against one face of the disc 84 and is held in abutting relation by means of the coil spring 88 situated around shaft 56 between part 85 and a suitable shoulder on the part 87. Leakage around shaft 64 is prevented by similar packing comprising ring 89 threaded on the shaft against which the resiliently supported ring 90 is pressed by the spring 91. The packing arrangement is not claimed herein, but is included in the subject matter disclosed and claimed in my copending application Serial No. 555,767 filed August 7, 1931.

Rotor member 54 is provided with a piston-like flange 92 extending closely adjacent a cylindrical portion of the housing part 50 to provide a substantially closed balancing chamber 93 between the disc portion of rotor 54 and the casing, into which balancing chamber fluid can pass from the main chamber through the clearance spaces adjacent ring 78.

The rotor 62 of the driven member is also provided with a piston-like flange 94 extending closely adjacent to a suitable shoulder on the housing part 51 to provide a balancing chamber 95 to which working fluid can pass from the main working chamber by way of the clearance spaces adjacent to rings 79 and 82. The rotor member 62 is provided with a number of ports 96 passing therethrough radially inside the piston flange 94 and the rotor 54 of the driving member is likewise provided with a number of ports 97 passing therethrough radially inside the outer periphery of the flared collar 71.

In the present embodiment, the transmission is not intended to employ working fluid from the cooling system of an engine and as shown in Figs. 10 and 11, the outer and inner portions of the main chamber for working fluid are connected by a jet pump device which utilizes the relatively high pressure at the radially outer part of the working chamber to maintain positive pressure at the radially inner part of the chamber and to cause flow of makeup fluid to the working chamber. As shown in Fig. 10, the casing part 50 is provided with a number of radially extending strengthening webs 98 and one of the webs 98a is enlarged to provide a radially extending channel connecting the clearance space between casing part 50 and the ring 78 with the annular chamber 99 at the inner part of the transmission, which is in communication with the working chamber by way of ports 97. In the channel thus provided, there is situated a nozzle 100 adapted to deliver fluid under pressure to a diffuser 101 and the space between these nozzles is in communication with a supply conduit 102 leading from any suitable reservoir containing working fluid for replacing that lost from the transmission due to leakage. The reservoir from which pipe 102 leads is preferably placed at a level above that of the transmission to provide a certain amount of static pressure head on the liquid being supplied to the transmission.

The above described jet pump arrangement forms no part of the present invention and is separately disclosed and claimed in my previously mentioned copending application Serial No. 555,767.

In order to provide for the necessary cooling of the working fluid the web 98b is enlarged as shown in Figs. 10 and 12 to provide a channel 103 communicating with the chamber 93 to which working fluid leaks under pressure through the clearance spaces adjacent to ring 78. Channel 103 is connected to a pipe 104 leading to a radiator or other cooler (not shown) which may be of any suitable closed type. Working fluid delivered to the cooler through pipe 104 is returned through pipe 105 (see Fig. 13) which connects with a passage 106 in web 98c. Passage 106 communicates at its inner end with the annular chamber 99 which is in turn in communication with the main working chamber by way of the ports 97. As will be noted from Fig. 12, the channel 103 is of relatively small cross-sectional area and this, coupled with the resistance to flow of fluid through pipes 104 and 105 and the cooler, prevents substantial loss of pressure in the balancing chamber 93, the difference in pressure between this chamber and that existing in chamber 99 providing the force necessary to circulate the working fluid through the cooling system.

The transmission in the present embodiment, like the one previously described, is capable of transmitting power in only one direction and, in order to secure reverse motion of the driven shaft member 67, a mechanical reverse gear is employed which is similar to the one previously described. This mechanism, carried in the housing part 68, comprises a counter shaft 107 upon which is mounted the sliding gear cluster comprising gears 108 and 109. Gear 110 is slidably mounted on splines 111 on shaft 64 and the forward end of the part 67 is provided with a gear having external teeth 112 and internal teeth 113. By means of the usual shifting fork arrangements (not shown) operated from the lever 114, gear 110 may be shifted axially so as to either engage the internal teeth 113 to provide direct drive or to engage the teeth of the usual reverse idler pinion (not shown) which in turn engages gear 108 to provide drive in reverse direction to part 67 through the meshing gears 109 and 112. The gear cluster on the counter shaft may also be advantageously connected to the operating lever 114 to enable gear 109 to be shifted out of engagement with gear 112 when gear 110 is meshed with gear 113 for direct drive.

Referring now more particularly to Figs. 14 to 18, I have shown the specific blading arrangement employed in this transmission, which I have found gives in practice the results which it is the primary object of my invention to produce. Fig. 14 shows the arrangement of pump blades 60, the first row of turbine blades 76 and the first row of guide blades 80.

The row of pump blades comprises 10 large blades 115, the inlet edges of which are on a circle 200 mm. in diameter and the outlet edges of which are on a circle 320 mm. in diameter. Between each two adjacent blades 115 are situated two equidistantly spaced intermediate blades 116, the outer or discharge edges of which are on the same circle as that of the discharge edges of the large blades. The inlet edges of the blades 116 are tangent to a circle 300 mm. in diameter. The pump blades 115 have an outlet angle of 42°, indicated at $\alpha$, (see Fig. 17). The size and position of the small blades 116 are relatively of less importance than for the large blades 115. The profiles of the pump blades are as shown in Figs. 14 and 17.

The first row of turbine blades 76 comprises 60 blades, the inlet edges of which are on a circle 330 mm. in diameter and the outlet edges of which are on a circle 370 mm. in diameter. These blades, as shown in Fig. 17, have an outlet angle $\alpha_1$ of 30°.

The second row of turbine blades 77 also comprises 60 blades, the inlet and outlet edges of which are on circles of the same diameter as those of blades 76 but as will be evident from Figs. 17 and 18, the inlet edges of the blades 76 are on the circle of smaller diameter while the inlet edges of blades 77 are on the circle of larger diameter. The blades 77 also are arranged with an outlet angle $\alpha_1$ of 30°.

The third row of turbine blades 72 are somewhat longer in radial direction than the preceding rows of turbine blades and comprise 26 blades, the inlet edges of which are on a circle 270 mm. in diameter and the outlet edges of which are on a circle 188 mm. in diameter. These blades are arranged with an outlet angle $\alpha_2$ of 41°.

Figs. 17 and 18 are accurate representations of the profiles employed for the turbine blades.

The first row of stationary guide blades 80 comprises 76 blades, the radially inner ends of which lie on a circle 404 mm. in diameter and the radially outer ends of which lie on a circle 452 mm. in diameter. These blades, as indicated in Fig. 16, have an outlet angle $\alpha_1$ of 30° and the profile employed is the same as that employed for the first two rows of turbine blades as indicated in the figure. The second row of guide blades 81 comprises 54 blades, the inlet edges of which are on a circle 320 mm. in diameter, the outlet edges lying on a circle 280 mm. in diameter. The outlet angle $\alpha_3$ for the blades in this row, as indicated in Fig. 18, is 35°, and the blade profile employed is also, as shown in this figure, like the profile used for the first two rows of turbine blades.

In Fig. 19 I have illustrated a modified form of pump blade which I have employed in later transmissions and which I find is satisfactory when used without intermediate blades. This blade, indicated at 117, is somewhat thinner in section than blades 115 and is arranged with substantially the same outlet angle as the blades 115. Blades 117 are, however, spaced closer peripherally than blades 115, 12 blades of the type indicated at 117 being used between blade circles of the same diameters as those indicated above for the 10 blades of the type indicated at 115.

Turning again to Fig. 18, which shows a number of rows of blading typical of the present invention, I will now point out the features of the blading which I believe to be essential to obtaining the efficiency characteristics of the transmission which I secure, and necessary to the best practical results.

As previously stated, it is highly important to avoid impact or shock losses and losses due to eddies resulting from the entrance of the working fluid to the turbine blade rows at angles widely differing from the angle at which the blades work with highest efficiency. From the diagrams of Figs. 3 and 4, it will be evident that the bluntly rounded inlet edges of the blades contribute materially to the smooth flow of fluid through the passages between the blades even with widely varying relative inlet angles of flow to the blades. In addition to this, however, it will be noted that the materially thickened inlet portions of the blades provide a very sharply contracting throat portion 118 (Fig. 18) in the passage between adjacent blades, which throat portion gradually merges into what may be termed the main portion of the channel which provides a further gradual contraction in the direction of flow of fluid toward the outlet of the passage. The sharply contracting throat portion 118 may be considered in the nature of a restriction providing sudden resistance to flow of the working fluid entering the blade row. This tends to build up local static pressure ahead of the blade row and the sharply contracting throat portion causes a relatively sudden increase in velocity of the working fluid as it enters the passage between the blades. This sudden change in velocity in the general direction of fluid flow, I believe, materially aids in causing relatively smooth flow of fluid through the blade row and also contributes materially to the force exerted on the blades and tending to rotate the member on which they are mounted. The gradual contracting main portion of the channel causes the fluid to flow therethrough with increasing velocity which also increases the reaction on the blades tending to turn the blade row. The degree to which the inlet portion of the channel is contracted at the throat is illustrated by the difference in dimension between the spacing represented by $x$ at the entrance of the blade row as compared with the dimension $y$ adjacent to the entrance of the blade row and the further contraction of the main portion of the channel is illustrated by the comparative extent of dimension $y$ and dimension $z$ at the outlet of the channel.

It will be evident to those skilled in the art that the exact contour of the blade profiles may be modified but I have found that in order to achieve the best results a blade profile similar to that shown in Fig. 18 is essential. This blade profile may be said to provide a blade having a bluntly rounded inlet portion forward of what may be termed the base section of substantially maximum thickness. In Fig. 18 the dimension $y$ is substantially at the base section of the blade and from this base section the blade tapers to a sharp outlet edge. I find that in order to secure the most satisfactory results, the thickness of the base section of the blade should be such that it is equal to at least substantially half of the circumferential width of the passage between adjacent blades measured on the circle at which the base section is located. In other words, the base section of the blade should be equal to at least substantially one half the dimension $y$ when these dimensions are measured on the same circle, concentric about the axis of rotation of the blade ring.

The inlet edges of the blades may be rounded to provide surfaces of different specific forms of curvature but I prefer to employ profiles which in section present curves of conic section at the inlet edges of the blades and as indicated in the examples herein given by way of illustration, I prefer to use profiles providing blades with inlet edges of substantially semi-cylindrical form.

Expressed in another way, the extent of the thickness of the blade adjacent to the inlet edge of the blade row is such that when the blade surfaces are considered with reference to the median line $m$ (Fig. 18) of the passage between adjacent blades, the length of the projection $n$ normal to the median line and extending to the surface of the blade at the inlet edge is one and one half times the length of the normal projection $n'$ extending to the surface of the blade at a relatively short distance from the inlet edge. With the blading constructed in accordance with the above defined general principles, the energy in the working fluid is extracted with practically satisfactory efficiency even with the relatively large maximum variation of from 90° to 140° in the relative inlet angle, which is possible between stationary and racing speeds of the turbine blading when the blading is arranged with outlet angles within the specified range of approximately 20° to 45°.

Furthermore, with the blading of the form and arrangement set forth, suitable torque multiplying characteristics are obtained and excessive losses due to friction drop, particularly at speeds approaching zero speed and racing speed, are avoided.

The result, from the standpoint of hydraulic efficiency, is the provision of a transmission having high maximum efficiency at the optimum point and efficiencies closely approaching the maximum efficiency through a speed range of comparatively great magnitude. This latter characteristic is of particular advantage in connection with the transmission of power from a prime mover to the driving wheels of a self-propelled vehicle.

In addition to the advantages which I obtain with respect to desirably high efficiencies, the transmission according to the present invention provides numerous other practical advantages of great importance. By causing the working fluid to travel in the path of circulation indicated, through the blade rows of two rotatable members co-axially mounted within a single stationary housing, all packing in the transmission is avoided except the packing provided around the shafts at the axis of the transmission. Thus, the linear amount of packing necessary is reduced to the minimum and the packing is also situated in the zone of lowest fluid pressure in the transmission. Both of these factors contribute materially to the reduction in leakage losses from the transmission. The arrangement shown also permits the construction of a transmission of given power with minimum dimensions and consequently minimum weight and cost. Also, the employment of a stationary outer casing is of material advantage from a practical standpoint in the installation and operation of the device in vehicles of all descriptions. The stationary casing allows all connections for liquids flowing to and from the transmission to be made with the greatest facility and also facilitates the mounting of control members and the like.

While I have hereinabove mentioned a mixture of kerosene and lubricating oil as the fluid used in a specific transmission, it will be apparent that other working fluids may be employed as for example water.

In the construction of the transmission I have found it practical to cast the pump member in one piece, with integral blades, but I prefer to make the pump and turbine members of separate parts, riveting or otherwise securing the blades to their respective supporting members in known manner.

It will be apparent to those skilled in the art that many variations in the design of the transmission may be made within the scope of my invention.

What I claim is:

1. A hydraulic variable-speed power transmission comprising a casing, a driving member rotatably mounted in said casing and comprising a row of pump blades, a driven member rotatably mounted in said casing and comprising a plurality of rows of turbine blades, and guide blades mounted in said casing, said casing and said members providing a closed path for flow of operating fluid serially through said pump blades and said turbine blades, said guide blades being interposed between adjacent rows of turbine blades, the turbine blades in the row first receiving operating fluid from the pump blades having an outlet angle within a range of which the lower limit is substantially 20° and the upper limit is substantially 45° and having profiles providing bluntly rounded inlet portions having a circumferential thickness on a circle concentric with the axis of rotation and radially closely adjacent to the inlet edge of the blade row providing passages for flow of fluid between adjacent blades having sharply contracted throat portions adapted to receive operating fluid with variations in relative inlet angle varying in value from substantially 90° to substantially 140°.

2. A hydraulic variable-speed power transmission comprising a casing, a driving member rotatably mounted in said casing and comprising a row of pump blades, a driven member rotatably mounted in said casing and comprising a plurality of rows of turbine blades, and guide blades mounted in said casing, said casing and said members providing a closed path for flow of operating fluid serially through said pump blades and said turbine blades, said guide blades being interposed between adjacent rows of turbine blades, the turbine blades in the row first receiving operating fluid from the pump blades having an outlet angle within a range of which the lower limit is substantially 20° and the upper limit is substantially 45°, said turbine blades being so thick adjacent to the inlet edge of the blade row as to form passages between adjacent blades wherein the length of the projection normal to the median line of the passage from the median line to the surface of the blade varies rapidly for a short distance along the median line from the inlet side of the blade row toward the outlet side thereof and then relatively slowly to said outlet side and wherein the length of such normal projection at the inlet side is one and one half times such normal projection at a relatively short distance from the inlet side.

3. In a variable-speed power transmission including a casing enclosing co-axially mounted interfitting driving and driven members, a ring of turbine blades concentric with the axis of rotation, said blades having bluntly rounded inlet edges and relatively sharp outlet edges and having outlet angles within a range of which the lower limit is substantially 20° and the upper limit of which is substantially 45° and said blades being so thick adjacent to the inlet edge of the ring as to form passages between adjacent blades wherein the length of the projection normal to the median line of the passage from the median line to the surface of the blade varies rapidly for a short distance along the median line from the inlet edge of the ring toward the outlet edge thereof and then relatively slowly to said outlet edge and wherein the length of such normal projection at said inlet edge is one and one half times such normal projection at a relatively short distance from said inlet edge.

4. A hydraulic variable-speed power transmission comprising a casing, a driving member rotatably mounted in said casing and comprising a row of pump blades, a driven member rotatably mounted in said casing and comprising a plurality of rows of turbine blades, and guide blades mounted in said casing, said casing and said members forming a closed path for flow of operating fluid including a portion for outward flow in generally radial direction and a portion for inward flow in generally radial direction, said row of pump blades being disposed in the outward flow portion of said path, one of said rows of turbine blades and a row of guide blades being disposed in the inward flow portion of said path, the inlet edges of said last mentioned row of turbine blades and the outlet edges of said row of guide blades being parallel to the axis of rotation and a second row of turbine blades disposed in said path radially outward of said pump blades and receiving fluid directly from said pump blades, said last named row of turbine blades having outlet angles within a range of which the lower limit is substantially 20° and the upper limit is substantially 45° and being bluntly rounded at their inlet portions and so thick adjacent to the inlet edge of the row as to form passages therebetween wherein the length of the projection normal to the median line of the passage from the median line to the surface of the blade varies rapidly for a short distance along the median line from said inlet edge toward the outlet edge of the row and then slowly to said outlet edge and wherein the length of such normal projection at said inlet edge is one and one half times such normal projection at a relatively short distance from said inlet edge.

5. A hydraulic variable-speed power transmission comprising a casing, co-axially mounted interfitting driving and driven members enclosed within said casing, said driving member comprising a ring of pump blades and said driven member comprising a plurality of rings of turbine blades, said casing and said members providing a closed path for flow of operating fluid including a portion for outward flow in generally radial direction and a portion for inward flow in generally radial direction, said ring of pump blades being disposed in the outward flow portion of said path, one of said rings of turbine blades being disposed in the outward flow portion of said path radially outward of said pump blades and receiving fluid directly from said pump blades, at least two of said rings of turbine blades being disposed in the inward flow portion of said path and rings of guide blades disposed between adjacent rings of turbine blades, said turbine blades having forward and rear portions having surfaces receding from base sections of the blades of substantially maximum thickness, said forward portions being substantially semi-cylindrical and said rear portions tapering gradually relative to the forward portions to sharp outlet edges, said turbine blades having outlet angles within a range of which the lower limit is substantially 20° and the upper limit is substantially 45°, said base sections having a thickness measured on a circle concentric with the axis of rotation at least equal to substantially half of the circumferential width of the passage between adjacent blades measured on said circle, said forward portions of adjacent blades providing sharply converging inlet portions for the passages between the blades, whereby said passages are adapted to receive operating fluid with variations in relative inlet angle varying in value from substantially 90° to substantially 140°.

6. A hydraulic variable-speed power transmission comprising a casing, a driving member rotatably mounted in said casing and comprising a row of pump blades, a driven member rotatably mounted in said casing and comprising a plurality of rows of turbine blades, and guide blades mounted in said casing, said casing and said members forming a closed path for flow of operating fluid including a portion for outward flow in generally radial direction and a portion for inward flow in generally radial direction, said row of pump blades being disposed in the outward flow portion of said path, one of said rows of turbine blades and a row of guide blades being disposed in the inward flow portion of said path and a second row of turbine blades disposed in said path radially outward of said row of pump blades and receiving operating fluid directly from said pump blades, said turbine blades having outlet angles within a range of which the lower limit is substantially 20° and the upper limit is substantially 45° and having inlet and outlet portions having surfaces receding from base sections of substantially maximum thickness of the blades, said inlet portions being substantially semi-cylindrical and said outlet portions tapering gradually relative to the inlet portions to sharp outlet edges, said base sections having a thickness measured on a circle concentric with the axis of rotation at least equal to substantially half of the circumferential width of the passages between adjacent blades measured on said circle, said inlet portions of adjacent blades providing sharply converging inlet portions for the passages between the blades whereby said passages are adapted to receive operating fluid with variations in relative inlet angle varying in value from substantially 90° to substantially 140°.

7. A hydraulic variable-speed power transmission comprising a casing, co-axially mounted interfitting driving and driven members enclosed within said casing, said driving member comprising a ring of pump blades and said driven member comprising a plurality of rings of turbine blades, said casing and said members providing a closed path for flow of operating fluid including a portion for outward flow in generally radial direction and a portion for inward flow in generally radial direction, said ring of pump blades being disposed in the outward flow portion of said path, one of said rings of turbine blades being disposed in the outward flow portion of said path radially outward of said pump blades and receiving fluid directly from said pump blades, at least two of said rings of turbine blades being disposed in the inward flow portion of said path and rings of guide blades disposed between adjacent rings of turbine blades, said turbine blades having outlet angles within a range of which the lower limit is substantially 20° and the upper limit is substantially 45° and having substantially semi-cylindrically rounded inlet portions, said inlet portions being so thick adjacent to the inlet edges of the blades as to form passages therebetween wherein the length of the projection normal to the median line of the passage from the median line to the surface of the blade varies rapidly for a short distance along the median line from the inlet edges of the blade toward the outlet edges and then slowly to said outlet edges and wherein the length of such normal projection at the inlet edges is one and one half times such normal projection at a relatively short distance from said inlet edges.

8. A hydraulic variable-speed power transmission comprising a casing, co-axially mounted interfitting driving and driven members enclosed within said casing, said driving member comprising a ring of pump blades and said driven member comprising a plurality of rings of turbine blades, said casing and said members providing a closed path for flow of operating fluid including a portion for outward flow in generally radial direction and a portion for inward flow in generally radial direction, said ring of pump blades being disposed in the inner part of the outward flow portion of said path and having outlet edges substantially parallel to the axis of rotation, one of said rings of turbine blades being disposed in the outward flow portion of said path radially outward of said pump blades and having inlet edges adjacent and substantially parallel to the outlet edges of said pump blades for receiving fluid directly therefrom, at least two of said rings of turbine blades being disposed in the inward flow portion of said path and having inlet edges substantially parallel to the axis of rotation, the outlet edges of the blades in the radially inner of said last mentioned rings of turbine blades being adjacent to the radially inner portion of said path, a ring of guide blades disposed in the inward flow portion of said path and between the rings of turbine blades therein, and a second ring of guide blades disposed in said path between the ring of turbine blades receiving fluid from said pump blades and the outermost ring of turbine blades in the inward portion of said path, said turbine blades having outlet angles within a range of which the lower limit is substantially 20° and the upper limit is substantially 45° and having substantially semi-cylindrical inlet portions so thick adjacent to the inlet edges of the rings as to form passages between adjacent blades wherein the length of the projection normal to the median line of the passage from the median line to the surface of the blade varies rapidly for a short distance along the median line from the inlet edges toward the outlet edges of the rings and then slowly to the outlet edges of the rings and wherein the length of such normal projection at the inlet edges is one and one half times such normal projection at a relatively short distance from the inlet edges.

9. A hydraulic variable-speed power transmission comprising a casing, a driving member rotatably mounted in said casing and comprising a row of pump blades, a driven member rotatably mounted in said casing and comprising a plurality of rows of turbine blades and a plurality of rows of guide blades mounted in said casing, said casing and said members forming a closed path for flow of operating fluid including a portion for outward flow in generally radial direction and a portion for inward flow in generally radial direction, said row of pump blades being disposed in the outward flow portion of said path, one of said rows of turbine blades being disposed in the outward flow portion of said path radially outward of said pump blades and receiving fluid directly from said pump blades, at least two of said rows of turbine blades being disposed in the inward flow portion of said path, one of said rows of guide blades being disposed in the inward flow portion of said path and between the rows of turbine blades, a second of said rows of guide blades being disposed in said path and extending inwardly from the casing at the outer part of said path, the inlet and outlet edges of a plurality of said rows of turbine blades being substantially parallel to the axis of rotation and said turbine blades having substantially semi-cylindrical inlet portions so thick adjacent to the inlet edges of the rows as to form passages between adjacent blades wherein the length of the projection normal to the median line of the passage from the median line to the surface of the blade varies rapidly for a short distance along the median line from the inlet edges toward the outlet edges and then slowly to the outlet edges and wherein the length of such normal projection at the inlet edges is one and one half times such normal projection at a relatively short distance from said inlet edges.

10. A hydraulic variable-speed power transmission comprising a casing, a driving member rotatably mounted in said casing and comprising a row of pump blades, a driven member rotatably mounted in said casing in axial alignment with said driving member and comprising a plurality of rows of turbine blades, and a plurality of rows of guide blades mounted in said casing, said casing and said members forming a closed path for flow of operating fluid including a portion for outward flow in generally radial direction and a portion for inward flow in generally radial direction, said row of pump blades being disposed in the outward flow portion of said path, one of said rows of turbine blades being disposed in the outward flow portion of said path radially outward of said pump blades and receiving fluid directly from said pump blades, at least two of said rows of turbine blades being disposed in the inward flow portion of said path, one of said rows of guide blades being disposed in the inward flow portion of said path and between the rows of turbine blades therein, a second of said rows of guide blades being disposed in said path and extending inwardly from the casing at the outer part of said path, the inlet and outlet edges of a plurality of said rows of turbine blades being parallel to the axis of rotation, said pump blades being thin compared to their height relative to said turbine blades, said turbine blades having forward and rear portions having surfaces receding from base sections thereof of maximum thickness, said forward portion being substantially semi-cylindrical and said rear portion tapering gradually relative to the forward portion to a sharp outlet edge, said turbine blades having outlet angles within a range of which the lower limit is substantially 20° and the upper limit is substantially 45°, said base sections having a thickness, measured on a circle concentric with the axis of rotation at least equal to substantially half of the circumferential width of the passages between adjacent blades measured on said circle, said forward portions of adjacent blades providing sharply converging inlet portions for the passages between the blades, whereby the blade passages are adapted to receive operating fluid with variations in relative inlet angle varying in value from substantially 90° to substantially 140°.

11. In a power plant, a motor of the type requiring a cooling fluid, a fluid operated variable-speed transmission driven by the motor, a conduit for conducting fluid from the transmission for cooling, a cooler receiving fluid from said conduit, a conduit for conducting cooled fluid from the cooler to the transmission, a pump in said last named conduit, means providing a restriction in said first named conduit for maintaining the fluid in the transmission under pressure, a conduit for conducting cooling fluid from the pump to the motor and a conduit for conducting fluid from the motor to the cooler.

12. A hydraulic variable-speed power transmission comprising a rotationally stationary casing providing a main chamber for operating fluid, a driving member comprising a shaft part rotatably mounted in said casing and a rotor part in said chamber having a row of pump blades, a driven member comprising a shaft part rotatably mounted in said casing coaxialy with the first mentioned shaft part and a rotor part in said chamber having a plurality of rows of turbine blades, said rotor parts comprising disc-like portions adjacent to the side walls of said chamber and said rows of blades being arranged to circulate operating fluid in a closed path of flow between said disc-like portions, the disc-like portion of the rotor of the driving member having a circular part cooperating with a portion of the adjacent side wall of said casing to provide a balancing chamber between the rotor and the casing radially outside of said circular part, a conduit for withdrawing operating fluid from said chamber for cooling, said conduit being in communication with said chamber at a place radially outside of said circular part and a conduit for returning cooled operating fluid to said chamber comprising a plurality of ports in the rotor of the driving member located radially inside of said row of pump blades and said circular part.

13. A hydraulic variable-speed power transmission comprising a rotationally stationary casing providing a main chamber for operating fluid, a driving member comprising a shaft part rotatably mounted in said casing and a rotor part in said chamber having a row of pump blades, a driven member having a shaft part rotatably mounted in said casing coaxially with the first mentioned shaft part and a rotor part in said chamber having a plurality of rows of turbine blades, said rotor parts comprising disc-like portions adjacent to the side walls of said chamber and said rows of blades being arranged to circulate working fluid in a closed path of flow between said disc-like portions, the disc-like portion of each of said rotors having a circular part cooperating with an adjacent portion of the casing to provide balancing chambers between the casing and each of the rotors, a conduit for withdrawing operating fluid from said chamber for cooling, said conduit being in communication with said chamber at a place radially outside of the circular parts of said disc-like portions and means for returning cooled operating fluid to said chamber comprising a conduit in communication with said chamber at a place radially inside said circular parts of said disc-like portions.

14. A hydraulic variable-speed power transmission comprising a rotationally stationary casing providing a main chamber for operating fluid, a driving member comprising a shaft part rotatably mounted in said casing and a rotor part in said chamber having a row of pump blades, a driven member comprising a shaft part rotatably mounted in said casing coaxially with the first mentioned shaft part and a rotor part in said chamber having a plurality of rows of turbine blades, said rotor parts comprising disc-like portions adjacent to the side walls of said chamber and said rows of blades being arranged to circulate operating fluid in a closed path of flow between said disc-like portions, a conduit for withdrawing operating fluid from said chamber for cooling, said conduit being in communication with said chamber at a place radially outside of said row of pump blades and a second conduit for returning cooled operating fluid to said chamber, the second conduit being in communication with said chamber at a place radially inside of said row of pump blades.

15. A hydraulic variable-speed power transmission comprising a rotationally stationary casing providing a main chamber for operating fluid, a driving member comprising a shaft part rotatably mounted in said casing and a rotor part in said chamber having a row of pump blades, and a driven member comprising a shaft part rotatably mounted in said casing coaxially with the first mentioned shaft part and a rotor part in said chamber having a plurality of rows of turbine blades, said rotor parts comprising disc-like portions adjacent to the side walls of said chamber and said rows of blades being arranged to circulate operating fluid in a closed path of flow between said disc-like portions, a part of each of said disc-like portions cooperating with an adjacent side wall of the chamber to form a balancing chamber for balancing axial thrust due to operating fluid circulating in said closed path of flow.

16. A hydraulic variable-speed power transmission comprising a rotationally stationary casing providing a main chamber for operating fluid, a driving member comprising a shaft part rotatably mounted in said casing and a rotor part in said chamber having a row of pump blades, a driven member comprising a shaft part rotatably mounted in said casing coaxially with the first mentioned shaft part and a rotor part in said chamber having a plurality of rows of turbine blades, said rotor parts comprising disc-like portions adjacent to the side walls of said chamber and said rows of blades being arranged to circulate operating fluid in a closed path of flow between said disc-like portions, a conduit for withdrawing operating fluid for cooling from said chamber, said conduit being in communication with said chamber at a place radially outside of said row of pump blades and a second conduit for returning cooled operating fluid to said chamber, the second conduit being in communication with said chamber at a place radially inside of said row of pump blades and comprising a plurality of ports through the rotor part of the driving member.

17. A hydraulic variable-speed power transmission comprising a rotationally stationary casing providing a chamber for operating fluid, a driving member and a driven member having coaxial shaft parts rotatably mounted in said casing, each of said members comprising a rotor part carrying one or more rows of blades for causing circulation of operating fluid in a closed path of flow within said chamber, said path of flow comprising a portion in which the flow of operating fluid is radially outward and a portion in which the flow of operating fluid is radially inward, means for withdrawing operating fluid for cooling from said chamber at a place radially outside of at least one of the rows of blades on the driving member, and means for returning cooled operating fluid to the radially inner portion of said chamber in the general direction of flow of the main body of operating fluid in the chamber.

18. A hydraulic variable-speed power transmission comprising a rotationally stationary casing providing a chamber for operating fluid, a driving member and a driven member having coaxial shaft parts rotatably mounted in said casing, each of said members comprising a rotor part carrying one or more rows of blades for causing circulation of operating fluid in a closed path of flow within said chamber, said path of flow comprising a portion in which the flow of operating fluid is radially outward and a portion in which the flow of operating fluid is radially inward, means for withdrawing operating fluid for cooling from said chamber at a place radially outside at least one row of blades on the driving member, and means for returning cooled operating fluid to the radially inner portion of said chamber in the general direction of flow of the main body of operating fluid in the chamber, the last mentioned means including a plurality of ports in the radially inner portion of one of said rotors and a shield carried by one of the rotors for deflecting the working fluid passing through said ports so as to cause it to enter said path of flow in the general direction of flow of the main body of operating fluid.

19. A hydraulic variable-speed power transmission comprising a rotationally stationary chamber for operating fluid, a driving member comprising a shaft rotatably mounted in said casing and a rotor in said chamber, said rotor carrying a row of pump blades, a driven member comprising a shaft rotatably mounted in said casing coaxially with the first mentioned shaft and a rotor in said chamber, the last mentioned rotor having a plurality of rows of turbine blades, said pump blades and said turbine blades being arranged to cause fluid in said chamber to flow in a closed path radially outwardly of the chamber adjacent to the rotor of the driving member and radially inwardly of the chamber adjacent to the rotor of the driven member and a shield carried by the driven member at the radially inner part of the rotor for guiding operating fluid flowing axially of said chamber at the radially inner portion thereof.

20. A hydraulic variable-speed power transmission comprising a rotationally stationary chamber for operating fluid, a driving member comprising a shaft rotatably mounted in said casing and a rotor in said chamber, said rotor carrying a row of pump blades, a driven member comprising a shaft rotatably mounted in said casing coaxially with the first mentioned shaft and a rotor in said chamber, the last mentioned rotor having a plurality of rows of turbine blades, said pump blades and said turbine blades being arranged to cause operating fluid in said chamber to flow in a closed path radially outwardly of the chamber adjacent to the rotor of the driving member and radially inwardly of the chamber adjacent to the rotor of the driven member and a flaring shield carried by said driven member and surrounding the hub portion of the rotor of the driving member for directing operating fluid into the first row of blades carried by the driving rotor.

In testimony whereof, I hereunto affix my signature.

ALF JAMES RUDOLF LYSHOLM.